United States Patent [19]
Georg

[11] 4,317,359
[45] Mar. 2, 1982

[54] SCREW PRESS
[76] Inventor: Otto Georg, Oststrasse 12,, 5805 Breckerfeld, Fed. Rep. of Germany
[21] Appl. No.: 80,799
[22] Filed: Sep. 28, 1979
[30] Foreign Application Priority Data
Oct. 3, 1978 [DE] Fed. Rep. of Germany ....... 2843010
Apr. 20, 1979 [DE] Fed. Rep. of Germany ....... 2917438
[51] Int. Cl.³ ............................ B21J 9/18; B30B 1/18
[52] U.S. Cl. ...................................... 72/454; 100/289
[58] Field of Search ........................... 72/454; 100/289
[56] References Cited
U.S. PATENT DOCUMENTS
1,951,229 3/1934 Zeh ...................................... 72/454
3,955,493 5/1976 Hany .................................. 100/289
FOREIGN PATENT DOCUMENTS
2652937 5/1978 Fed. Rep. of Germany ...... 100/289
2005443 8/1978 Fed. Rep. of Germany ...... 100/289
25112 11/1957 German Democratic Rep. .................................... 100/289
41897 8/1964 German Democratic Rep. .................................... 100/289
282590 12/1927 United Kingdom .

Primary Examiner—Gene P. Crosby
Attorney, Agent, or Firm—Toren, McGeady & Stanger

[57] ABSTRACT

A screw press includes a ram, mounted for reciprocating movement relative to a press body, having a rotatably mounted threaded spindle extending therefrom, and a flywheel joined to the spindle for transmitting movement to the ram. The flywheel is driven by a friction disk which is arranged to engage the outer periphery of the flywheel, the disk being mounted on a shaft supported in the press body for rotational and axial movement relative to the body. When desired, the shaft can be axially moved to cause the disk to engage the flywheel, and an associated drive unit including a drive motor operates to rotatably drive the disk, thereby causing the ram to be moved within a work space in the press body. Preferably, one or more pairs of friction disks are arranged about the flywheel, each of the disks having an associated drive unit whereby the ram can be moved at different speeds and its direction reversed in accordance with the types of drive motors provided in the drive units.

18 Claims, 4 Drawing Figures

SCREW PRESS

BACKGROUND OF THE INVENTION

The present invention relates generally to screw presses, and more particularly, to a screw press of the type wherein a ram is mounted for movement up and down within a press body by way of a spindle having a flywheel mounted thereon, the flywheel being driven by friction disks in alternating directions of rotation through friction gear units associated with the disks.

In order to improve the drive mechanisms for friction gears, particularly when used in friction disk screw drive presses, a number of suggestions have been made. In particular, for relatively heavy screw presses having spindle diameters up to 1,000 mm., it was believed until now that the introduction of considerable quantities of energy within only seconds could be handled only hydraulically or by direct electric drive mechanisms. In such cases, up to six electric or hydraulic motors are grouped around the central disk of the screw press, the motors acting by way of pinions on teeth associated with the central disk. These pinions cannot be disengaged as the press strikes, so that the backlash of the press is fully communicated to the pinions, thereby subjecting them to a high degree of wear. Another disadvantage of these known presses is that the drive mechanisms required are extremely expensive and delicate.

In contrast with the direct hydraulic or electric drive mechanisms, a simple friction drive has been employed in a known screw press of the above type because of its simplicity and its ability to transmit great energy in a short time, and is still being used today in smaller presses. Such a friction drive press is disclosed in British Pat. No. 282,590. However, this known screw press has the disadvantage that only one disk can be used at a time to transmit drive energy to the flywheel, and the further disadvantage that due to the unilateral driving arrangement, the spindle is likewise loaded unilaterally. It has, therefore, been attempted to double the supply of energy by applying two opposed side disks rotating in opposite directions relative to each other. However, this attempt has failed up to now because of the difficulty in actuating reverse motion.

It is an object of the present invention to provide a screw press wherein the wear of the spindle is substantially alleviated.

It is another object of the present invention to provide a screw press, wherein relatively high energy is communicated to the flywheel, and hence, to the spindle.

It is also an object of the present invention to provide a screw press, wherein the return travel of the ram is simply achieved.

It is still another object of the present invention to provide a screw press, wherein very exact adjustments, such as setting of the height of the ram, are achieved with relatively simple means.

The problems encountered in the prior screw presses are solved according to the present invention by providing, in the screw press, a number of friction gear units in which each friction disk is mounted singly on a rotatable, axially displaceable shaft, the friction disks being directly drivable by associated drive motors. The shafts for the friction disks are provided with means for urging the friction disks against the flywheel, and with means for displacing the disks away from the flywheel.

Because a friction gear drive arrangement is employed, but with the provision of a friction gear unit consisting of a friction disk and associated gear driving mechanism, the present invention solves the problems discussed above in a particularly simple, and yet very effective manner.

The present invention is not limited to a specific type of friction gear drive, for example, rotary piston combustion engines, hydraulic motors or electric motors may be provided as drive motors.

In one embodiment, the present invention provides an electric motor as a drive unit, the pinion of the motor meshing with a gear rim provided on the friction disk. With this particular relationship between the drive motor and friction disk, a sufficient gear ratio thereby exists depending on the selection of the number of teeth and diameters for the pinion and the gear rim. Instead of this drive arrangement, a belt drive, V-belt drive, chain drive or the like may be provided.

As a consequence of the broad drive principle, including a friction disk gear and a drive motor pinion, the present invention contemplates that the friction disks can be equipped on their sides opposite from the flywheel with a gear secured to the friction disk and in meshed engagement with the pinion of the electric motor, so that the friction disk itself is equipped on its outer circumference with a gear rim meshing with the pinion of the electric motor, or the friction disk can be equipped with an inner sun gear rim of a smaller diameter than that of the friction disk, with which the pinion of the electric motor meshes. This latter arrangement has the additional advantage that, at a selected gear ratio between the pinion and gear rim, the friction disk is not subjected to any limitations in its diameter, so that it can be enlarged radially outwardly as desired.

In a specific embodiment, the means for moving the friction disk to and from the flywheel includes a piston provided at the free end of the friction disk shaft, the piston being axially displaceable in a cylinder provided in the machine body. With such a piston and cylinder arrangement, the displacement of the friction disk shaft can be effected in a simple manner. For example, in accordance with the present invention, the piston and cylinder unit can be pressurized by a pressure medium, in particular, a hydraulic fluid such as hydraulic oil, compressed air or the like and, theoretically, displacement also by means of an ignitable explosive mixture in the cylinder is possible. The piston and cylinder arrangement can be pressured with a pressure medium alternately on both sides to be moved by corresponding control valves.

It has been found especially expedient to provide a reset spring for the generation of the returning force on the side of the piston opposite its working face and between the piston and a portion of the press body. To adjust the reset path of the friction disk and to compensate for disk drive belt wear, a stop screw is provided in the piston cylinder head.

By mounting the friction disk shaft in a sliding or roller bearing to permit axial displacement of the shaft, the present invention provides an especially sturdily constructed screw press, requiring little maintenance.

To enable the transmission of relatively large forces to the flywheel, the present invention contemplates providing at least two friction gear units arranged about the circumference of the flywheel, preferably symmetrically. In special situations, instead of two friction gear units, there may be provided four, six or more friction gear units about the circumference of the flywheel, preferably also symmetrically, in accordance with the present invention. It will be understood that since the friction gear units, which can be produced in modular form, can be provided about the circumference of the flywheel as needed, the present invention makes possible the use of multiple sources of energy.

The present invention also solves, in a very simple manner, a problem not to be overlooked in screw presses. This problem relates to the difficulty of adjusting tools, i.e., the difficulty of precisely effecting the vertical adjustment of the ram. A known solution consists of briefly pressing the friction disks against the flywheel, and then using a brake for stopping. However, since the relative velocity between the disks can reach a value up to 25 meters per second, not only is a great quantity of energy lost, but also the life of the covering on the working face of the flywheel and of the brake is considerably reduced due to such heavy wear.

These disadvantages are avoided by the present invention in that one of the friction gear units arranged at the circumference of the flywheel is drivable at a low speed in both directions of rotation for adjustment of the ram. The present invention, therefore allows the flywheel to absorb only relatively little energy, which is appropriately controllable by the drive motor. Friction losses are avoided as is considerable wear on the faces of the flywheel and friction disk which rub against each other during operation.

The present invention contemplates several different drive arrangements. In particular, the friction gear unit can be driven by a low speed, reversible motor of high gear ratio so that the gear unit is drivable in both directions. The unit can also be driven by two motors, both acting alternately on the same shaft, one of which is designed for secondary use at a high gear ratio relative to that of the main motor. Further, the friction gear unit can be driven by a reversible pole electric motor having a relatively high pole ratio so that a speed jump between 3,000 rpm and 500 rpm, for example, can be obtained.

Yet another contemplated drive arrangement includes a drive motor with a change gear system to enable the direction of rotation of the disk to be changed.

It may also be provided, according to the present invention, that reversible motors for reversing the direction of the friction disk include motor brakes to enable the ram to be precisely adjusted.

These and other objects, features and advantages of the present invention will become more apparent when read in conjunction with the accompanying drawings.

DETAILED DESCRIPTION OF THE INVENTION

Figure 1:
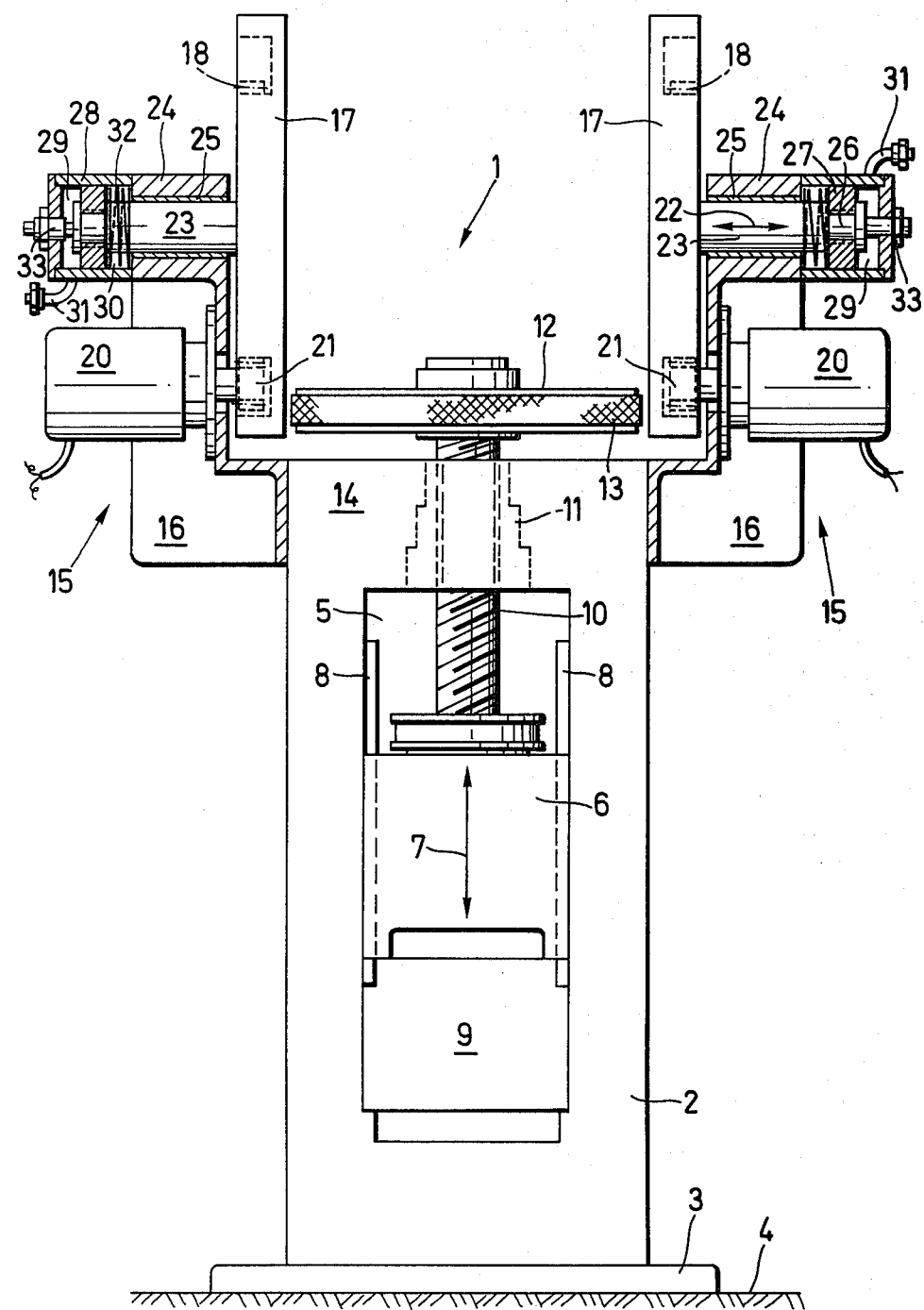
FIG. 1 is a front elevational view, partly in section, of a screw press in accordance with the present invention.

FIG. 1 shows a screw press 1 in accordance with the present invention, the press 1 basically includes a press body or frame 2, which is secured by a base plate 3 on a floor 4, for example, in a factory building. In the press body 2, and inside a working space 5, a ram 6 is arranged to be movable up and down in the directions of the double arrow 7, the ram 6 being guided in lateral guides 8 to prevent rotation thereof. Opposite ram 6, a die counter piece 9 is provided in the working space 5. Depending on the workpiece to be shaped, the ram 6 and die counter piece 9 may be exchanged for other tools.

Ram 6 is secured on a rotatable spindle 10 which, in turn, is guided within a nut 11. Nut 11 is secured in the press body 2 and is shown merely in phantom lines in FIG. 1.

At its free end opposite ram 6, spindle 10 supports a flywheel 12 for transmitting rotational movement to the spindle. Flywheel 12 is coaxially connected to the spindle 10 so that no relative rotational movement can occur between them. Flywheel 12 has a friction drive belt 13 secured to its outer circumferential periphery. Belt 13 may be made of highly wear-resistant plastic, leather, or the like, and is preferably replaceable after wear.

At the head or top end 14 of the press body 2, friction gear units 15 are arranged about the circumference of the flywheel 12 by way of bearing arms 16. In the embodiment of FIG. 1, two such units are shown, while in the embodiment of FIG. 3, four units are shown and, in the embodiment of FIG. 4, six such units are shown.

Figure 2:
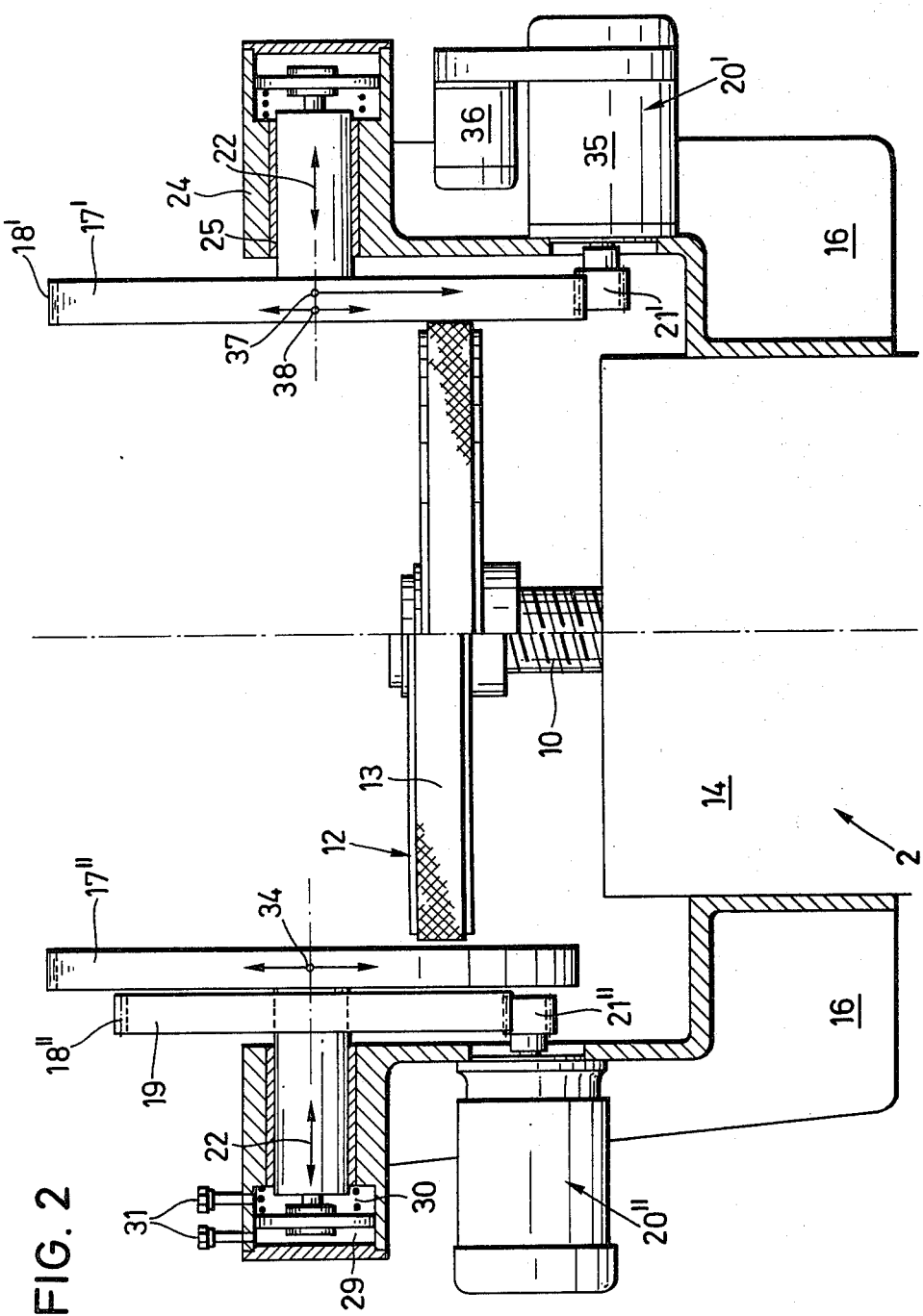
FIG. 2 is an enlarged view of the screw press of FIG. 1, showing details of two different friction gear units, the left half of the figure showing a drive motor engaging a friction disk drive gear, and the right half of the figure showing a drive motor having a piggy back motor for driving a friction disk.

As can be seen in FIGS. 1 and 2, each friction gear unit 15 includes a friction disk 17 with a gear rim 18. The axis of each friction disk 17 extends substantially perpendicular to the axis of the spindle 10 so that the disk confronts the outer periphery of the flywheel. In FIG. 1, the gear rim 18 is formed in an inner region of friction disk 17, the rim 18 being of smaller diameter than the disk 17. In the right hand embodiment of FIG. 2, an external gear rim 18' on friction disk 17' is constructed, and in the embodiment in the left half portion of FIG. 2, an external gear rim 18" on a separate gear 19 is provided. Gear 19 is coaxially connected to friction disk 17" so that no relative rotational movement can occur between them.

A drive motor 20 is arranged on the bearing arm 16, the motor shaft carrying a pinion 21 (or 21' or 21") in meshed engagement with the gear rim 18 (or 18' or 18"). The arrangement of teeth between pinion 21 and gear rim 18 is selected so that axial displacement of friction disk 17 in the direction of double arrow 22 is possible.

To enable displacement of friction disk 17 in the direction of double arrow 22, friction disk 17 is provided with a shaft 23 which is supported for rotational and axial movement within a bearing bushing 25, the latter being mounted in a bearing block 24 on the bearing arm 16.

Shaft 23 is provided with a piston 27 at its end 26 opposite the disk 17, piston 27 being secured thereat by a screw and a holding plate, as indicated in FIG. 1. On the bearing block 24, a cylinder 28 is arranged coaxially with shaft 23, so that piston 27 is slidably mounted within the cylinder 28.

As is evident, for example, from the left half of FIG. 2, piston 27 divides the cylinder 28 into chambers 29 and 30. These chambers are provided with connecting lines 31 by which a pressure medium, e.g., hydraulic oil can be introduced alternately by each line to a chamber to allow movement of the piston in the directions of double arrow 22 and, hence, movement of the shaft 23 with corresponding movement of the friction disk 17. The left half of FIG. 2 shows the friction disk 17″ in a position moved away from the flywheel 12 while the right half of the figure shows friction disk 17′ in contact with the flywheel.

As shown in FIG. 1, instead of both cylinder chambers, only one cylinder chamber 29 may be equipped with a corresponding connection 31 for a hydraulic fluid, while a compression spring 32 is inserted in cylinder chamber 30 between the side of the piston facing the disk and a portion of the press body. Spring 32 is able to supply a reset force in a direction to counter displacement of the hydraulic fluid in cylinder chamber 29. A stop screw 33 is provided to adjust the path of back stroke of piston 27 and, hence, that of shaft 23 and disk 17. This adjustment may become necessary particularly upon wear of the belt 13 on the flywheel 12.

In FIG. 1 are shown two symmetrically arranged and opposed friction gear units 15, the two drive motors 20 which may be electric motors, for example, being adapted for synchronous running. The direction of rotation of the motors can be reversed by the appropriate pole reversal. By applying the friction disks 17 against flywheel 12, the latter can then be controlled either to lower or lift the ram according to the arrow 7.

Figure 3:
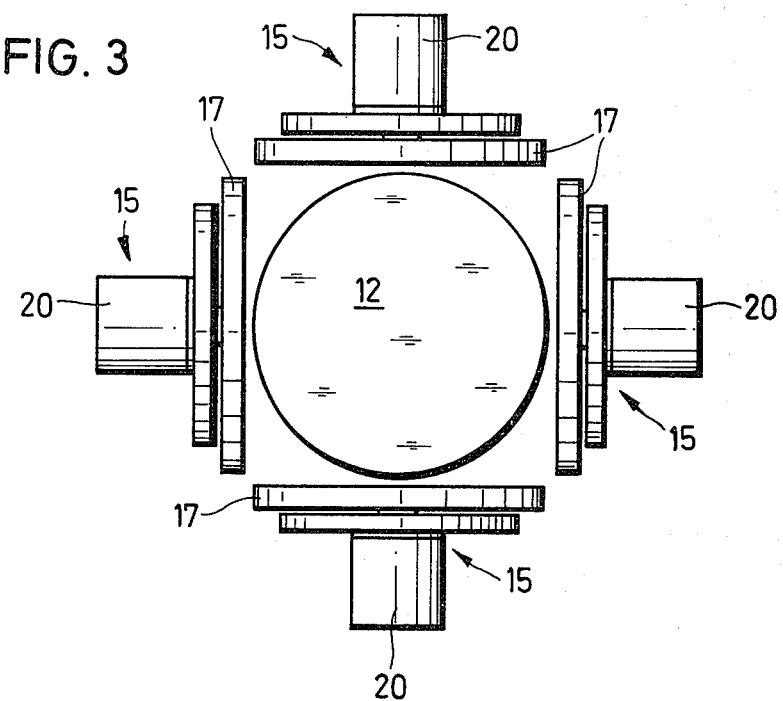
FIG. 3 is a plan view of the flywheel in the screw press of FIG. 1, showing an arrangement of friction disk drive units about the circumference of the flywheel in accordance with the present invention.

In the same way, a similar set-up can be arrived at as shown, for example, in an arrangement according to FIG. 3, wherein two opposed friction gear units 15 act only in one working direction, one pair thereby causing the lifting movement and another pair the lowering movement, of the ram.

Figure 4:
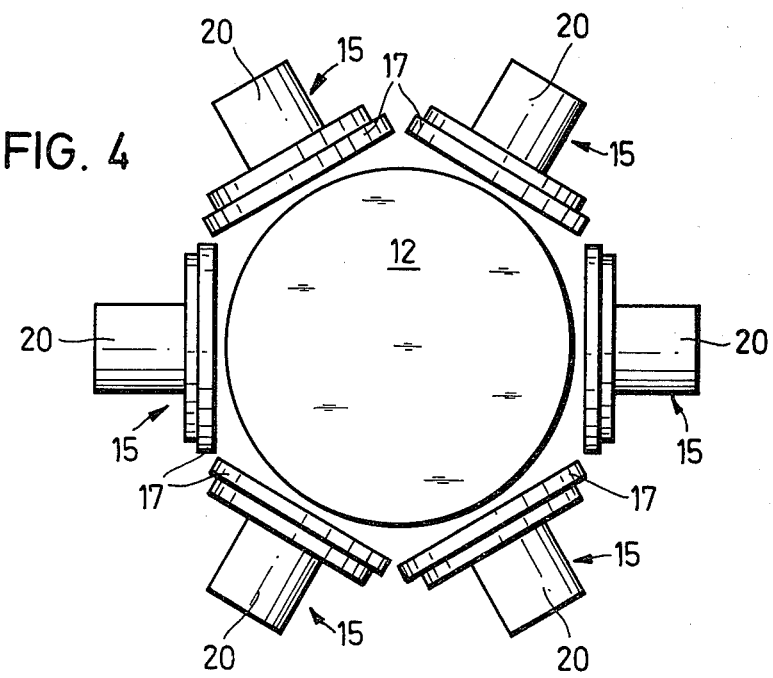
FIG. 4 is a plan view of the flywheel showing another arrangement of friction disk drive units arranged about the circumference of the flywheel in accordance with the present invention.

In FIG. 4, an arrangement is shown such that two pairs, i.e., four friction gear units control the flywheel 12 in one direction, preferably the striking direction or lowering direction of the ram, while a pair of opposed units 15 bring about the lifting movement wherein the friction drive disks run in the opposite direction. Also, three units 15 may be used for each drive direction. It is also possible to arrange individual units offset in height relative to each other to obtain special effects.

In FIG. 2, the possibility is indicated to arrange the motor as a reversible motor 20″, to rotate friction disk 17″ in both directions as indicated by the double headed arrow 34. Such a motor can be used, for example, exclusively for adjusting the tool, i.e., have a very slow speed or very high gear ratio, in order to rotate this one friction disk for tool adjustment very slowly.

Another possible arrangement of different working or adjusting feed mechanisms is indicated in the right half of FIG. 2, which shows a piggy back motor 20′, including a main motor 35 and a second motor 36, both of which act on the same shaft. Here, a gear ratio of 1:8 can be selected, e.g., and at appropriate speed, a selection of a further ratio of 1:16 or 1:24 can also be obtained. The different modes of drive are indicated with the single arrow 37 and with the double arrow 38 in the right half of FIG. 2.

For expedience, the reversible motors can be designed as brake motors, so that it is not necessary to operate an additional brake (not shown) provided on the screw press for reasons of safety.

Naturally, the described embodiments can be further modified in many respects, without departing from the basic aspects of the present invention. Thus, for example, adjustment of the friction disk shafts can be performed by magnetic means if the shaft is also the core of a magnetic coil. Also, instead of the electric motor shown in the figures, hydraulic drives may be chosen, which then act coaxially on the friction disk shaft. For increasing the energy to be supplied, two or more levels of friction gear units 15 may be arranged one above the other, or a larger number of pairs of the units 15 can be arranged about a flywheel 12 of still larger diameter.

While the embodiments of the invention have been described in detail hereinabove, it will be evident to those skilled in the art that there are many modifications, changes and additions which may be made herein without departing from the spirit and scope of the invention.

What is claimed is:

1. A screw press comprising a press body, a ram mounted for reciprocating movement relative to said body, a threaded spindle extending from said ram for transmitting movement to said ram, a nut member mounted in said press body for supporting said spindle for rotational movement about the axis of said spindle and for moving said spindle in the axial direction thereof when said spindle is rotated, a flywheel coaxially joined to said spindle for transmitting rotational movement to said spindle, and a plurality in excess of two friction gear units arranged about the circumference of said flywheel for rotatably driving said flywheel, each of said friction gear units including a friction disk having its axis extending substantially perpendicular to the axis of said spindle so that said disk confronts the outer periphery of said flywheel, a shaft extending coaxially from said disk and supported by said press body for rotational and axial movement relative to said press body, wherein said disk is movable between a first position whereat said disk contacts the outer periphery of said flywheel to transmit rotational movement to said flywheel and a second position whereat said disk is moved away from said flywheel, means for moving each said disk toward said first position and means for moving each said disk toward said second position, and a drive unit supported by said press body for independently rotatably driving each said disk, said press body being arranged so that more than two of said friction gear units can be arranged at selected locations about the circumference of said flywheel to obtain desired movement of said ram when selected ones of said friction gear units are actuated to drive said flywheel.

2. A screw press according to claim 1, wherein said friction disk has a gear rim thereon, and said drive unit includes an electric motor having a pinion in meshed engagement with said gear rim.

3. A screw press according to claim 1, wherein said friction disk has a gear rigidly coupled to the side thereof facing away from said flywheel, and said drive unit includes an electric motor having a pinion in meshed engagement with said gear.

4. A screw press according to claim 2, wherein said gear rim is provided on the outer circumference of said friction disk.

5. A screw press according to claim 2, wherein said gear rim is formed in an inner region of and has a smaller diameter than said friction disk.

6. A screw press according to claim 1, wherein said press body includes a cylinder thereon and said friction disk shaft has a piston at the end thereof opposite said disk, said piston being arranged for axial movement within said cylinder.

7. A screw press according to claim 6, further including means associated with said cylinder for conveying a pressurized fluid for moving said piston to thereby move said disk.

8. A screw press according to claim 6 or 7, wherein said means for moving said disk toward said second position includes a return spring arranged between the side of said piston facing said disk and a portion of said press body.

9. A screw press according to claim 6, further including a stop screw arranged at one end of said cylinder for limiting the path of movement of said piston when said disk is moved toward said second position.

10. A screw press according to claim 1, wherein said press body includes a bearing for supporting said friction disk shaft for axial and rotational movement.

11. A screw press according to claim 1, wherein four said friction gear units are operatively arranged about the circumference of said flywheel.

12. A screw press according to claim 1, wherein at least six said friction gear units are operatively arranged about the circumference of said flywheel.

13. A screw press according to claim 11 or 12, wherein pairs of mutually opposed friction gear units are arranged to cooperate with each other.

14. A screw press according to claim 1, wherein one of said friction gear units is arranged to drive said flywheel at a rotational speed sufficiently slow and in either direction to enable said cam to be moved to a given position.

15. A screw press according to claim 14, wherein said one of said friction gear units includes a reversible motor having a sufficiently high gear ratio to enable said motor to drive said friction gear unit.

16. A screw press according to claim 14, wherein said one of said friction gear units includes two motors which are alternately actuated to drive a common shaft, one of said motors being arranged as a secondary motor and having a higher gear ratio relative to the other motor.

17. A screw press according to claim 14, wherein said one of said friction gear units includes a reversible pole electric motor having a sufficiently high number of poles to enable said motor to drive said friction gear unit.

18. A screw press comprising a press body, a ram mounted for reciprocating movement relative to said body, a threaded spindle extending from said ram for transmitting movement to said ram, a nut member mounted in said press body for supporting said spindle for rotational movement about the axis of said spindle and for moving said spindle in the axial direction thereof when said spindle is rotated, a flywheel coaxially joined to said spindle for transmitting rotational movement to said spindle, and at least two friction gear units arranged about the circumference of said flywheel for rotatably driving said flywheel, each of said friction gear units including a friction disk having its axis extending substantially perpendicular to the axis of said spindle so that said disk confronts the outer periphery of said flywheel, a disk shaft extending coaxially from said disk and supported by said press body for rotational and axial movement relative to said press body, wherein said disk is movable between a first position whereat said disk contacts the outer periphery of said flywheel to transmit rotational movement to said flywheel and a second position whereat said disk is moved away from said flywheel, means for moving said friction disk toward said first position and means for moving said disk toward said second position, and a drive unit supported by said press body for rotatably driving said disk, said drive unit of one of said friction gear units including a common drive shaft and two motors which are arranged to be alternately actuated to drive said common drive shaft, one of said motors being arranged as a secondary motor and having a higher gear ratio relative to the other motor to drive said flywheel at a rotational speed sufficiently slow and in either direction to enable said ram to be moved to a given position.

* * * * *